(12) United States Patent
Diana et al.

(10) Patent No.: US 11,852,858 B2
(45) Date of Patent: Dec. 26, 2023

(54) LATERAL EDGE-LIT LIGHT-GUIDE OPTICS FOR LED LIGHTING

(71) Applicant: LUMILEDS LLC, San Jose, CA (US)

(72) Inventors: Frederic Diana, San Jose, CA (US); Ken Ratica, San Jose, CA (US); Carlos Rodriguez, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 107 days.

(21) Appl. No.: 17/505,504

(22) Filed: Oct. 19, 2021

(65) Prior Publication Data

US 2022/0120954 A1 Apr. 21, 2022

Related U.S. Application Data (60) Provisional application No. 63/094,042, filed on Oct. 20, 2020.

(51) Int. Cl.
*F21V 8/00* (2006.01)

(52) U.S. Cl.
CPC ......... *G02B 6/0031* (2013.01); *G02B 6/0083* (2013.01); *G02B 6/0085* (2013.01); *G02B 6/0088* (2013.01)

(58) Field of Classification Search
CPC .. G02B 6/0031; G02B 6/0083; G02B 6/0085; G02B 6/0088
See application file for complete search history.

(56) References Cited

U.S. PATENT DOCUMENTS

| 8,061,884 | B2 | 11/2011 | Harbers et al. |
| 10,345,509 | B2 | 7/2019 | Den Breejen et al. |
| 11,029,564 | B1* | 6/2021 | Aas ..................... G02B 6/0023 |
| 2008/0049445 | A1* | 2/2008 | Harbers ............... G02B 6/0025 362/615 |
| 2012/0176786 | A1* | 7/2012 | Presley ............. G02F 1/133611 362/225 |
| 2014/0071711 | A1 | 3/2014 | Boulais |
| 2018/0364409 | A1* | 12/2018 | Lee ..................... G02B 6/0031 |

FOREIGN PATENT DOCUMENTS

| CN | 100439997 C | * | 12/2008 | ......... G02B 27/1053 |
| CN | 109283737 A | * | 1/2019 | .......... G02B 6/0065 |
| WO | WO-2012128063 A1 | * | 9/2012 | ............. H04N 5/655 |

* cited by examiner

*Primary Examiner* — Mary Ellen Bowman (57) ABSTRACT

A LED lighting system includes a power supply, a LED controller, and a light guide plate having a top, a bottom, and an edge. A printed circuit board connected to the power supply is positioned at least partially under the bottom of the light guide plate. At least one surface-emitting LED is positioned on the printed circuit board adjacent to the light guide plate and directed to emit light vertically. A partially transmissive reflector is attached to extend between the top of the edge of the light guide plate and the printed circuit board to direct vertically emitted light from the at least one surface-emitting LED into the edge of the light guide plate.

20 Claims, 7 Drawing Sheets

LATERAL EDGE-LIT LIGHT-GUIDE OPTICS FOR LED LIGHTING

CROSS REFERENCE TO RELATED APPLICATIONS

This application claims benefit of priority to U.S. Provisional Patent Application No. 63/094,042 filed Oct. 20, 2020, which is incorporated herein by reference in its entirety.

TECHNICAL FIELD

The present disclosure relates generally to edge-lit LED light guide plates used for area lighting. In one embodiment, side reflectors can be used to frame and illuminate a light guide plate.

BACKGROUND

Conventional lights are being replaced by more efficient and more reliable LED luminaires. Unfortunately, existing LED-based luminaires are often composed of multiple and visible LEDs which can produce discomfort to the eyes (glare) due to their high peak luminance producing pixelated or spotty light sources. Accordingly, there is need for improved luminaire designs that provide controllable light distribution patterns with minimized glare and spottiness, without relying on expensive secondary optics.

SUMMARY

In one embodiment a luminaire includes a light guide plate having a top, a bottom, and an edge. A printed circuit board has a top side and a bottom side and is positioned at least partially under the bottom of the light guide plate. At least one LED is positioned on the printed circuit adjacent to the light guide plate and directed to emit light vertically. A reflector is attached to extend between the top of the edge and the printed circuit board to direct vertically emitted light from the at least one LED into the edge of the light guide plate.

In one embodiment the reflector is partially transmissive.

In one embodiment the reflector is positioned within a surrounding bezel.

In one embodiment the reflector is adhesively attached to the top of the edge of the light guide plate.

In one embodiment the reflector is adhesively attached to the printed circuit board.

In one embodiment the printed circuit board has an attached electrical connector positioned on the top side and in electrical connection with the at least one LED.

In one embodiment the printed circuit board has an attached electrical connector positioned on the bottom side and in electrical connection with the at least one LED.

In one embodiment the printed circuit board is attached to a heat sink.

In one embodiment the printed circuit board is attached to a heat sink that extends from the bottom side of the light guide plate in contact with the bottom of the light guide plate.

In one embodiment a LED lighting system includes a power supply, a LED controller, and a light guide plate having a top, a bottom, and an edge. A printed circuit board is connected to the power supply and the LED controller. The printed circuit board has a top side and a bottom side and is positioned at least partially under the bottom of the light guide plate. At least one LED is positioned on the printed circuit board adjacent to the light guide plate and directed to emit light vertically. A reflector is attached to extend between the top of the edge and the printed circuit board to direct vertically emitted light from the at least one LED into the edge of the light guide plate.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
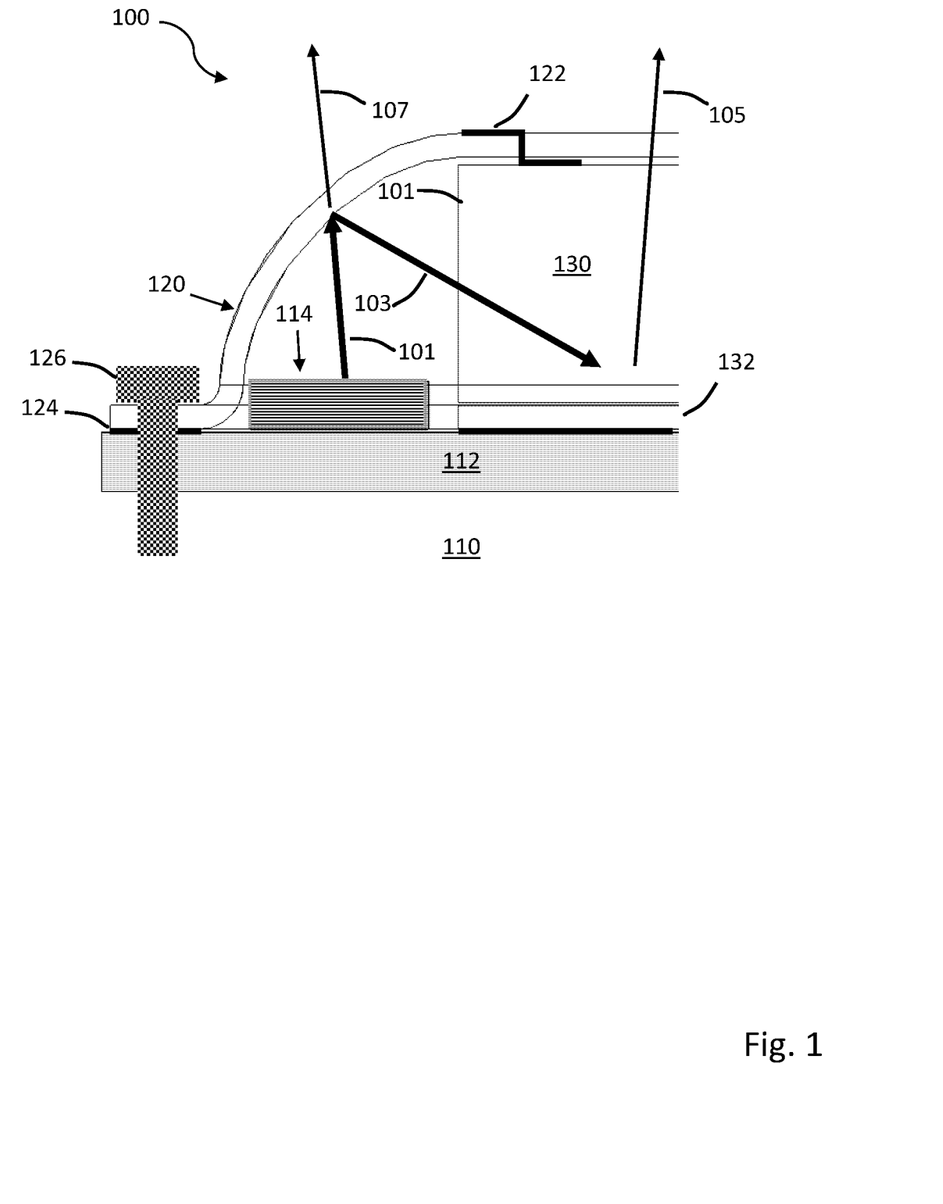
FIG. 1 illustrates a luminaire including a light guide plate and a partially transmissive side reflector.

FIG. 1 illustrates a luminaire 100 including a light guide plate 130 with backside reflector 132 and a partially transmissive side reflector 120. As partially illustrated in cross section in FIG. 1, a heat sink or dual heat sink/reflector panel 110 is attached and supports a printed circuit board 112. In some embodiments, the printed circuit board 112 can extend completely under the light guide plate 130. In other embodiments, only a rim or edge of the light guide plate is supported by the printed circuit board 112. In still other embodiments, only selected tabs or portions of the printed circuit board extend under the light guide plate 130.

Positioned on top of the printed circuit board 112 and adjacent to the light guide plate 130 is at least one semiconductor light-emitting diode (LED) 114. While only one LED is indicated in FIG. 1, dozens, hundreds, or more LEDs can be used to provide light. In some embodiments, mini or microLEDs that support thousands or more LEDs can be used.

The partially transmissive side reflector 120 is adhesively attached by double sided tape 122 or other suitable adhesive or film to a top of the light guide plate 130. The partially transmissive side reflector 120 is also attached by double sided tape 124 or other suitable adhesive or film to a frontside of the printed circuit board 112. A connector 126 can be used to hold together the partially transmissive side reflector 120, the printed circuit board 112, and the heat sink or dual heat sink/reflector panel 110.

In operation, the LED 114 is powered and controlled to emit light in a mostly vertical direction as light beam 101. Some proportion of light incident on the partially transmissive side reflector 120 is redirected by an angled or curved surface of the partially transmissive side reflector 120 toward light guide plate 130 (light beam 103). After reflection and transmission within the wave guide, some proportion of light exits as light beam 105. Also exiting the luminaire 100 is some proportion of light as light beam 107. In some embodiments, the intensity of exiting light beams 107 can be set to approximate the intensity of beams 105 providing substantially uniform illumination by configuring the reflectivity of the partially transmissive side reflector 120. In other embodiments, by configuring the reflectivity of the partially transmissive side reflector 120, the intensity of exiting light beams 107 can be set to be greater than or less than the intensity of beams 105, providing a distinctive visual light frame for the luminaire 100. In some embodiments, use of a transmissive side reflector 120 can enable tuning of Lambertian to Batwing light distribution ratio and increase optical efficiency.

In some embodiments the LED 114 may be selected from LEDs including but not limited to LEDs formed of sapphire or silicon carbide. The LED 114 can include a light extraction surface from which most of the light emitted by the LED exits. The LED 114 can be formed from an epitaxially grown or deposited semiconductor n-layer. A semiconductor p-layer can then be sequentially grown or deposited on the n-layer, forming an active layer at the junction between the n and p layers. Semiconductor materials capable of forming high-brightness light emitting devices can include, but are not limited to, Group III-V semiconductors, particularly binary, ternary, and quaternary alloys of gallium, aluminum, indium, and nitrogen, also referred to as III-nitride materials. In certain embodiment, laser light emitting elements can be used. In some embodiments, the LED 114 is an (e.g., top) surface-emitting LED. A surface-emitting LED emits light mostly in the vertical direction as shown in light beam 101 of FIG. 1. Surface-emitting LEDs are LED that have active layers oriented parallel to the LED light extraction surface.

The color of emitted light from the LED 114 can be modified using a phosphor contained in glass, or as a pre-formed sintered ceramic phosphor, which can include one or more wavelength converting materials able to create white light or monochromatic light of other colors. All or only a portion of the light emitted by the LED 114 may be converted by the wavelength converting material of the phosphor. Unconverted light may be part of the final spectrum of light, though it need not be. Examples of common devices include a blue-emitting LED segment combined with a yellow-emitting phosphor, a blue-emitting LED segment combined with green- and red-emitting phosphors, a UV-emitting LED segment combined with blue- and yellow-emitting phosphors, and a UV-emitting LED segment combined with blue-, green-, and red-emitting phosphors.

The direction of light emitted from each LED 114 can be modified by optics (not shown). Optics can be a single optical element or comprise multiple optical elements. Optical elements can include, for example, converging or diverging lenses, aspherical lenses, Fresnel lenses, graded index lenses, mirrors, beam diffusers, filters, masks, apertures, collimators, or light waveguides. Optics can be positioned at a distance from the LED 114 to receive and redirect light from multiple LEDs 114. Alternatively, optics can be set adjacent to each LED element to guide, focus, or defocus emitted light.

In some embodiments the partially transmissive side reflector can include fully or partially mirrored surfaces. Partially transmissive surfaces can be translucent or transparent in places. Multiple partially transmissive side reflectors can be used. In some embodiments, the partially transmissive side reflector can be colored. In other embodiments, the partially transmissive side reflector can be coated with wavelength converters. The partially transmissive side reflector can be curved, faceted, or provide reflection at single or multiple angles. The partially transmissive side reflector can be made of materials including, for example, glass, plastic, or ceramics. Polycarbonate, polyethylene, PMMA, or other suitable polymeric materials can be used.

In some embodiments the light guide plate 130 is positioned and configured to laterally receive LED light through an edge and redirect it to exit from a top surface. The light guide plate is provided with different features that impart directionality on the light emitted from the luminaire 100. Those features may include the shape of the light guide, dots that are printed on the light guide, prisms that are molded on the light guide, grooves that are molded or etched on the light guide, and/or random surface roughening. In some embodiments, dots may redirect incident light in a diffusive/directional manner to achieve a desirable light distribution pattern. The dots may have diameters on the order of 1 mm, for example. Additionally or alternatively, in some implementations, the dots may be pitched at 1 mm or less. In such instances, the luminaire may appear uniformly white to an observer due to the close proximity between the dots. In some implementations, the dots may be printed with ink using screen printing and/or any other suitable printing technique. Additionally, or alternatively, the dots may be epoxy-based or silicone-based and contain diffusing particles, such as $SiO_2$, $TiO_2$, or high index micro-beads. Depending on the desired light distribution pattern, dots or features can be regularly, semi-randomly, or randomly ordered. For example, in some embodiments, patterns can include increasing dot density away from an edge, or Gaussian dot patterns can used. As a result of those features, the luminaire may not need to rely on secondary optics to achieve a particular distribution pattern. Notwithstanding, the luminaire may also be used in conjunction with secondary optics if needed.

According to aspects of the present disclosure, a light guide is disclosed for use in various lighting applications. The light guide may be a slate, slab, or rectangular shaped object formed of a transparent or translucent material. The slate may have a plurality of edges, and two surfaces. Most of the light output by the light guide may exit the light guide through one or more of the surfaces. Accordingly, any of the surfaces from which light is emitted may be referred to as a light exit surface. In some implementations, one or more surfaces may be provided with a reflector to reflect light towards a designated light exit surface. In other embodiments, a light guide plate can be curved. Shapes can include but are not limited to symmetrically curved, curved with different amounts of curvature, asymmetrically curved, curved along one axis, or curved along two or more axes (e.g., spherical or saddle shaped). Lighting can be provided along one, two, or more edges. The curved light guide plates can be of uniform thickness in cross section, or alternatively can thicken or thin near edges. In one embodiment, a concave single curvature can be used. In other embodiments, a convex single curvature can be used. In still another embodiment, concave paraboloid shapes (like a shallow bowl) can be used.

According to aspects of the present disclosure, a light guide can be used for producing symmetrical or asymmetrical light distribution patterns. In some embodiments the light guide features can have slanted side edges. In other embodiments, a thickness of the light guide plate can vary. In some embodiments, multiple sides are available for lateral injection of light. Rectangular, square, ellipsoid, or circular light guide plates can be used. Although not illustrated in FIG. 1, in some embodiments light beam 105 exits a light guide plate at a shallow angle with respect to the light exit surface, i.e., at an angle less than 45 degrees with respect to the plane of the light exit surface of the light guide plate. In such embodiments having a partially transmissive side reflector can be advantageous in providing more illumination, e.g., light beam 107, in a more vertical direction, i.e., at an angle greater than 45 degrees with respect to the plane of the light exit surface of the light guide plate. The combination of light from the light guide plate and light transmitted through the partially transmissive side reflector allows for a more Batwing light distribution and for higher optical efficiency.

Figure 2:
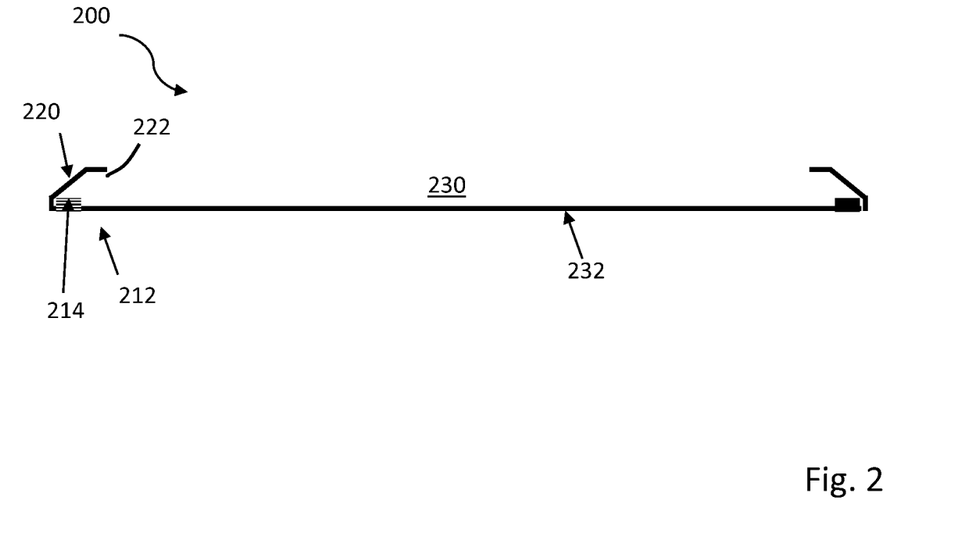
FIG. 2 illustrates a luminaire including a light guide plate adhesively attached to a side reflector.

FIG. 2 illustrates a luminaire 200 including a light guide plate 230 adhesively attached to a side reflector 220. The side reflector 220 is angled to extend between the light guide plate 230 and a printed circuit board 212 that also supports a surface emitting LED 214. The side reflector is adhesively attached with clear double-sided tape 222 to a top of the light guide plate 230. In one embodiment the printed circuit board 212 is also adhesively attached to the side reflector 220. In some embodiments, the reflector 220 can be distinct and separate from a reflector 232 positioned under the light guide plate 230. In other embodiments, the reflector 220 can be integral with a reflector 232 and is arranged to be folded and wrapped around the light guide plate 230. In this embodiment, LEDs and angled reflectors are positioned on opposing edges of the light guide. In other embodiments, opposing edge LEDs can be omitted.

Figure 3:
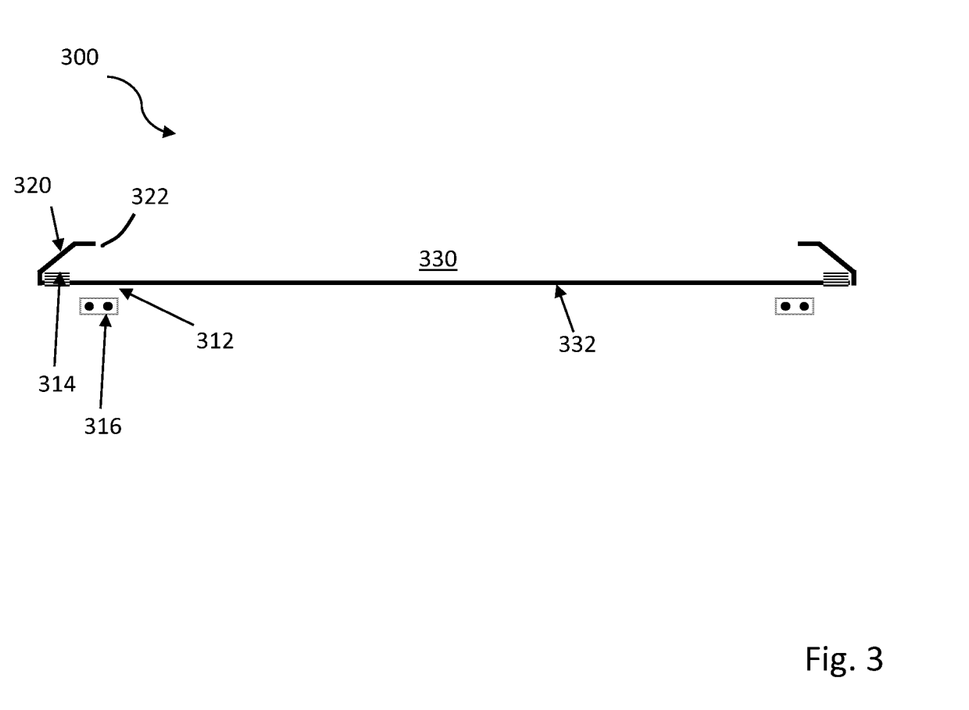
FIG. 3 illustrates a luminaire including a light guide plate, a side reflector, and a connector on a backside of a printed circuit board.

FIG. 3 illustrates a luminaire 300 including a light guide plate 330, a side reflector 320, and a connector 316 on a backside of a printed circuit board 312. The side reflector 320 is angled to extend between the light guide plate 330 and a printed circuit board 312 that also supports a surface emitting LED 314. The side reflector 320 is adhesively attached with clear double-sided tape 322 to a top of the light guide plate 330, which can further include reflector 332.

Figure 4:
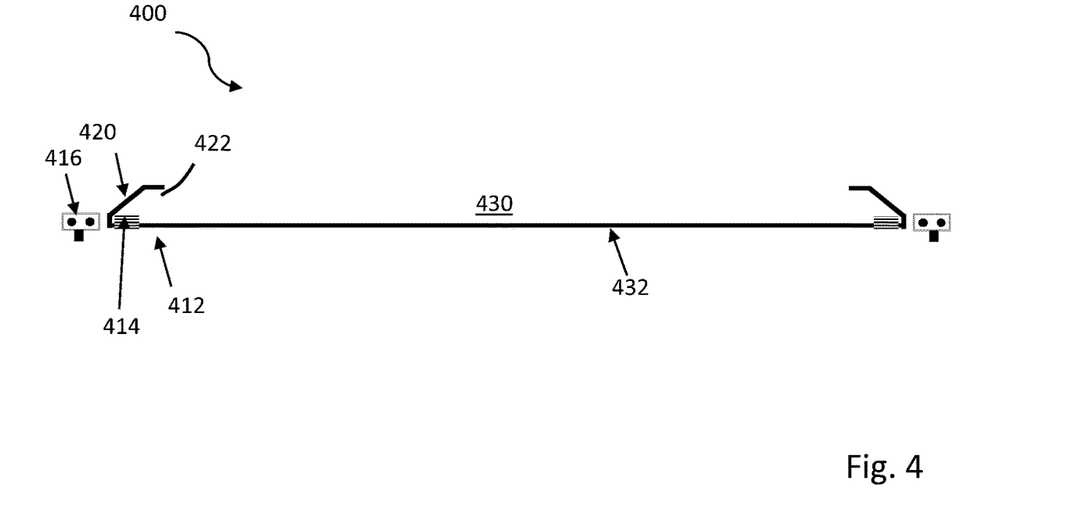
FIG. 4 illustrates a luminaire including a light guide plate, a side reflector, and a connector on a topside of a printed circuit board.

FIG. 4 illustrates a luminaire 400 including a light guide plate 430, a side reflector 420, and a connector 416 on a frontside of a printed circuit board 412. The side reflector 420 is angled to extend between the light guide plate 430 and a printed circuit board 412 that also supports a surface emitting LED 414. The side reflector 420 is adhesively attached with clear double-sided tape 422 to a top of the light guide plate 430, which can further include reflector 432.

Figure 5:
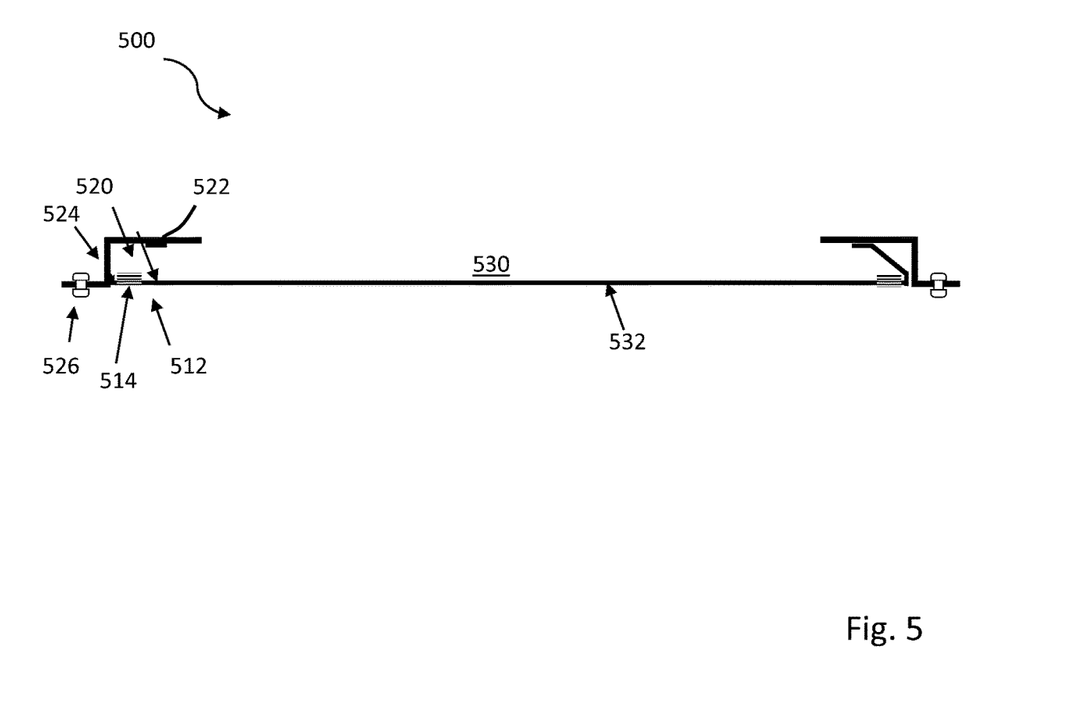
FIG. 5 illustrates a luminaire including a light guide plate, a side reflector, and a covering plastic bezel.

FIG. 5 illustrates a luminaire 500 including a light guide plate 530, a side reflector 520, and a covering plastic bezel 524. In some embodiments the side reflector 520 can be omitted, with light redirection being provided by the plastic bezel 524. The side reflector 520 is angled to extend between the light guide plate 530 and a printed circuit board 512 that also supports a surface emitting LED 514. The side reflector 520 is adhesively attached with clear double-sided tape 522 to a top of the light guide plate 530, which can further include reflector 532. The plastic bezel 524 can also be attached with double sided tape or adhesive, or alternatively can be attached with a connector 526 that can be used to hold together the side reflector 520, the printed circuit board 512, and optional heat sink (not shown).

Figure 6:
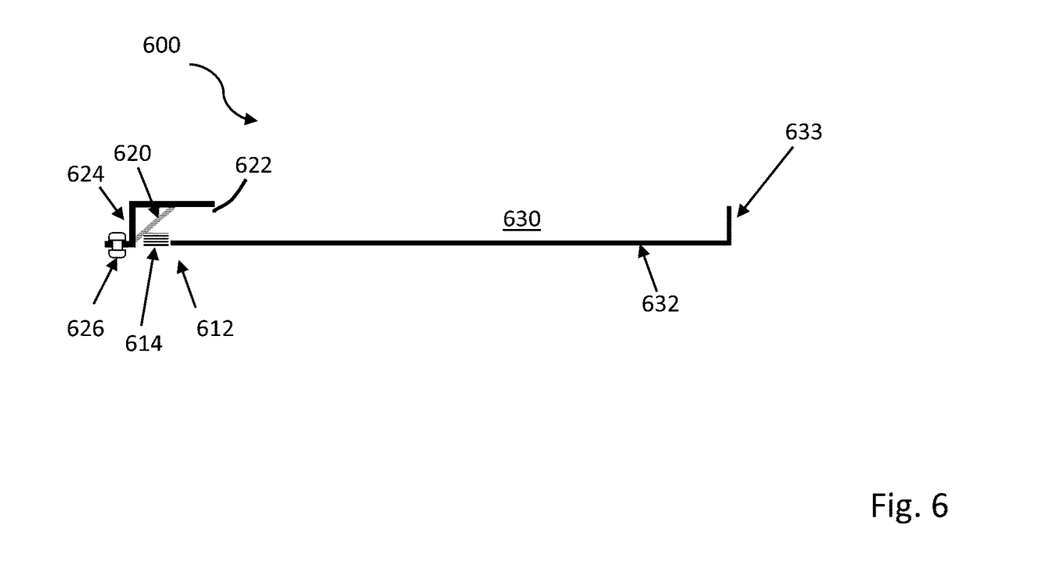
FIG. 6 illustrates a luminaire including a light guide plate, a side reflector, an internal reflector, and a covering plastic bezel.

FIG. 6 illustrates a luminaire 600 including a light guide plate 630, a side reflector 620, and a covering plastic bezel 624. In some embodiments the side reflector 620 can be omitted, with light redirection being provided by the plastic bezel 624. The side reflector 620 is angled to extend between the light guide plate 630 and a printed circuit board 612 that also supports a surface emitting LED 614. The side reflector 620 is adhesively attached with clear double-sided tape 622 to a top of the light guide plate 630, which can further include reflector 632. The plastic bezel 624 can also be attached with double sided tape or adhesive, or alternatively can be attached with a connector 626 that can be used to hold together the side reflector 620, the printed circuit board 612, and optional heat sink (not shown). In this embodiment, the reflector 632 extending under the light guide plate 630 is also wrapped around an edge 633 to reflect light back into the light guide plate 630.

Figure 7:
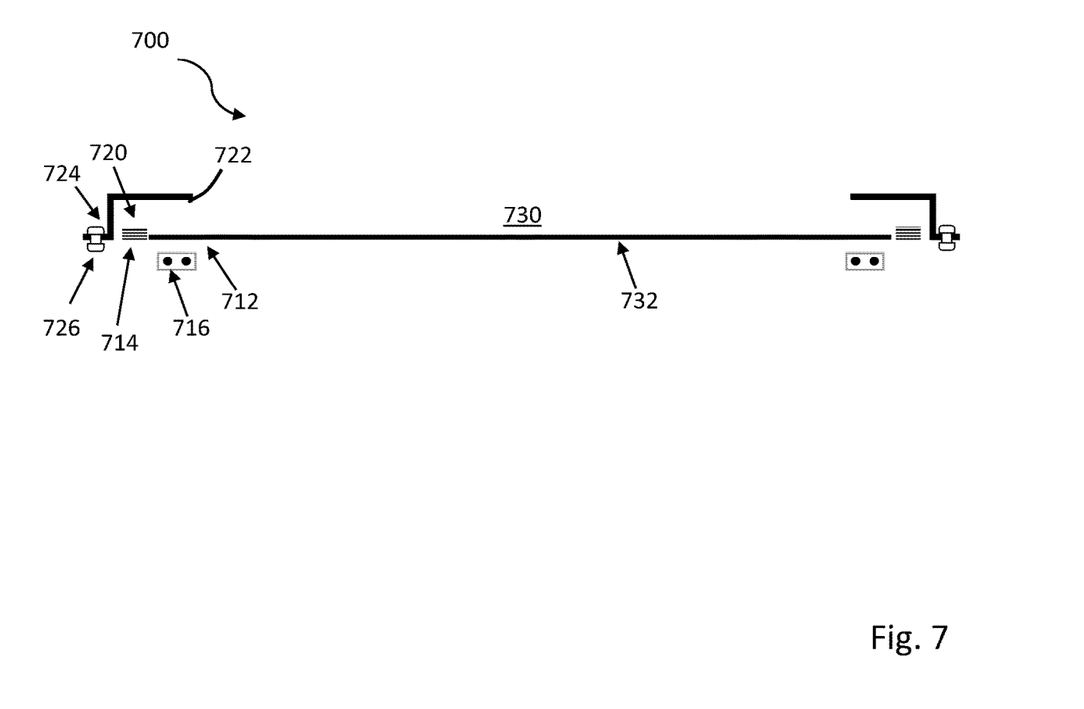
FIG. 7 illustrates a luminaire including a light guide plate, a side reflector, an internal reflector, a connector on a backside of a printed circuit board, and a covering plastic bezel.

FIG. 7 illustrates a luminaire 700 including a light guide plate 730, a side reflector 720, a connector 716 on a backside of a printed circuit board 712, and a covering plastic bezel 724. The side reflector 720 is angled to extend between the light guide plate 730 and the printed circuit board 712 that also supports a surface emitting LED 714. The side reflector 720 is adhesively attached with clear double-sided tape 722 to a top of the light guide plate 730, which can further include reflector 732. The plastic bezel 724 can also be attached with double sided tape or adhesive, or alternatively can be attached with a connector 726 that can be used to hold together the side reflector 720, the printed circuit board 712, and optional heat sink (not shown).

Figure 8:
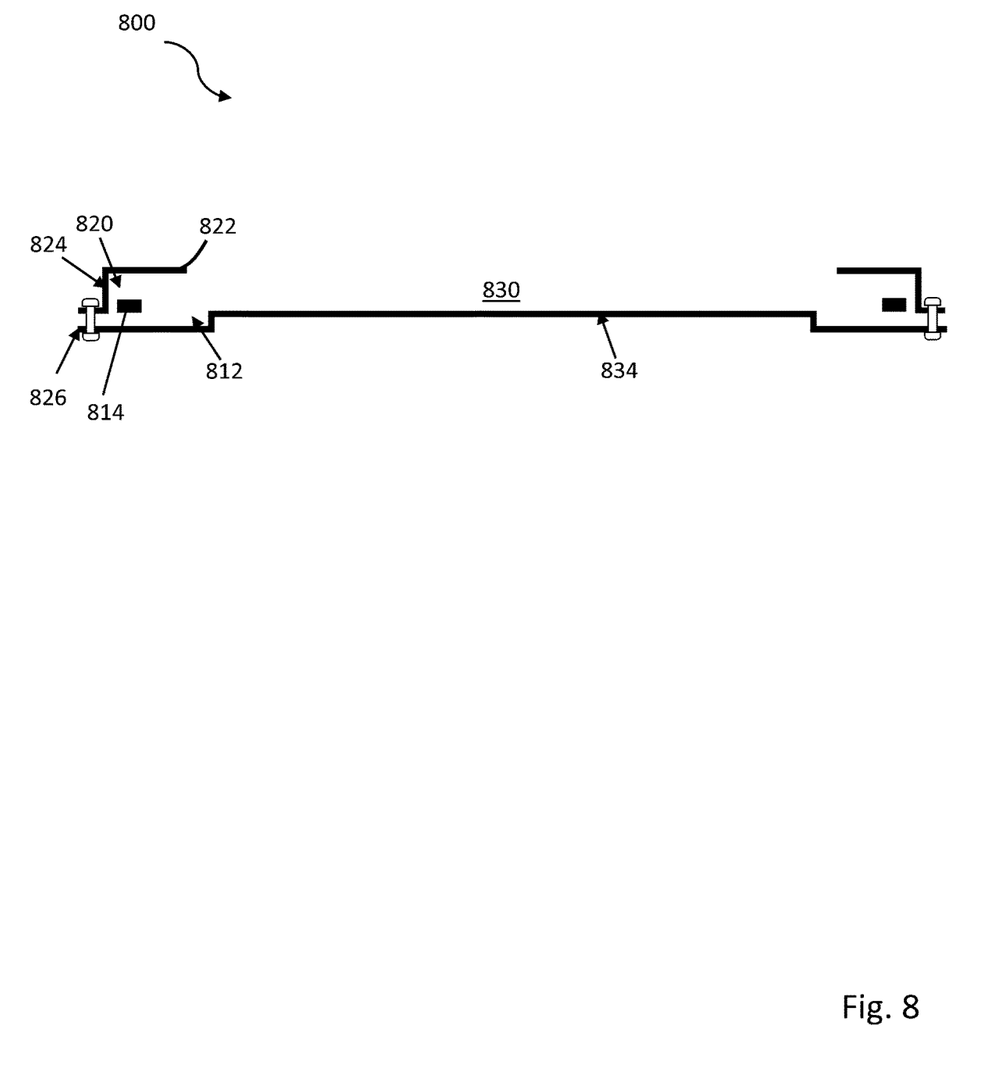
FIG. 8 illustrates a luminaire including a light guide plate, a side reflector, and a supporting thermally conductive plate positioned under a printed circuit board and the light guide plate.

FIG. 8 illustrates a luminaire 800 including a light guide plate 830, a side reflector 820, and a supporting thermally conductive and reflective plate 834 positioned under a printed circuit board 812 and the light guide plate 830. The side reflector 820 is angled to extend between the light guide plate 830 and the printed circuit board 812 that also supports a surface emitting LED 814. The side reflector 820 is adhesively attached with clear double-sided tape 822 to a top of the light guide plate 830. A plastic bezel 824 can also be attached with double sided tape or adhesive, or alternatively can be attached with a connector 826 that can be used to hold together the side reflector 820, the printed circuit board 812, and the supporting thermally conductive and reflective plate 834.

Figure 9A:
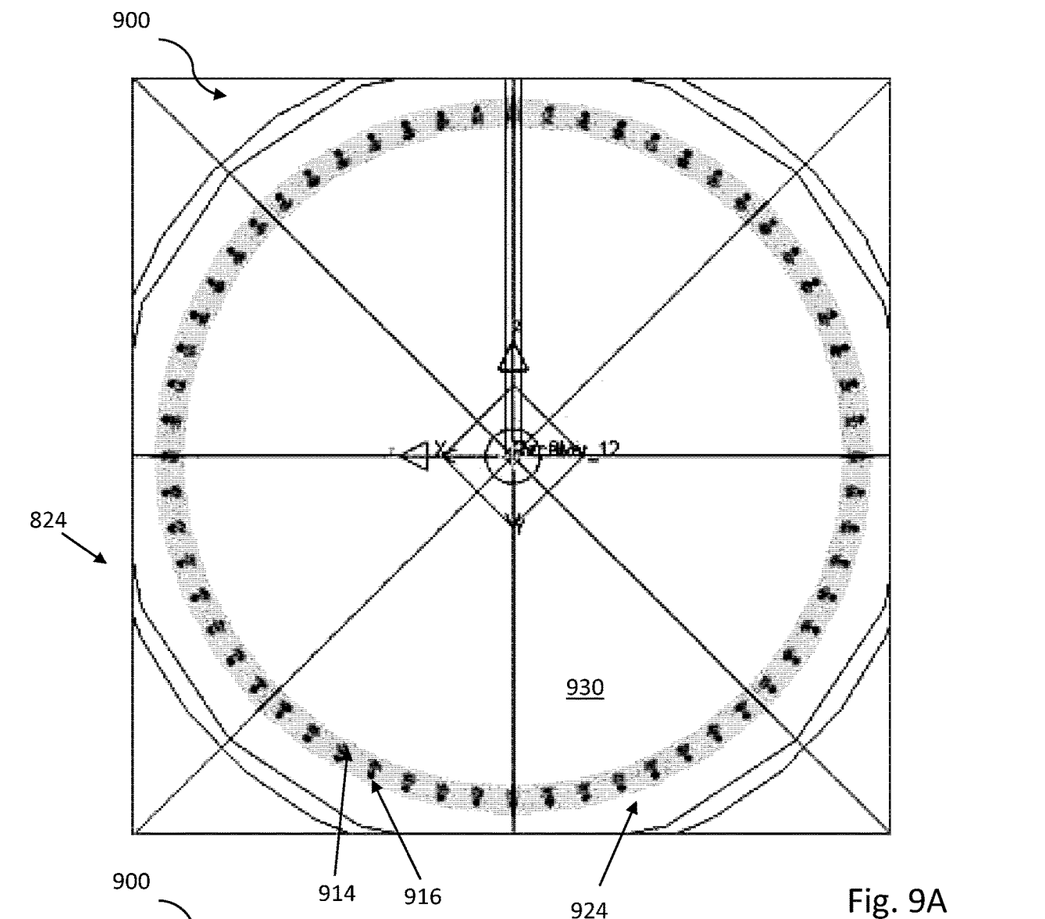
FIGS. 9A and 9B illustrate in top view and cross section a luminaire including a light guide plate, a side reflector, and a dual chamber bezel covering LEDs.
Figure 9B:
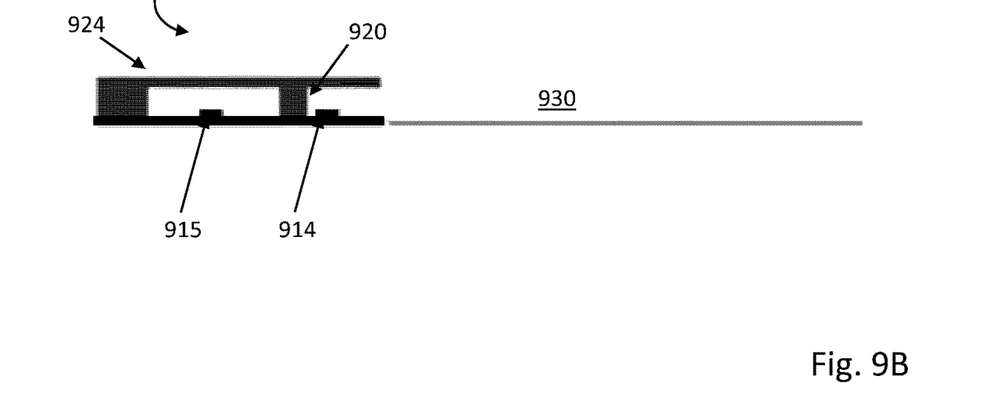

FIGS. 9A and 9B illustrate in top view (FIG. 9A) and cross section view (FIG. 9B) a luminaire 900 including a light guide plate 930, a side reflector 920, and a partially light transmissive dual chamber bezel 924 respectively covering surface emitting LEDs 914 in a first enclosure and surface emitting LEDs 915 in a second enclosure. This arrangement advantageously allows separate control of intensity or color of light exiting the first and second enclosures.

Figure 10:
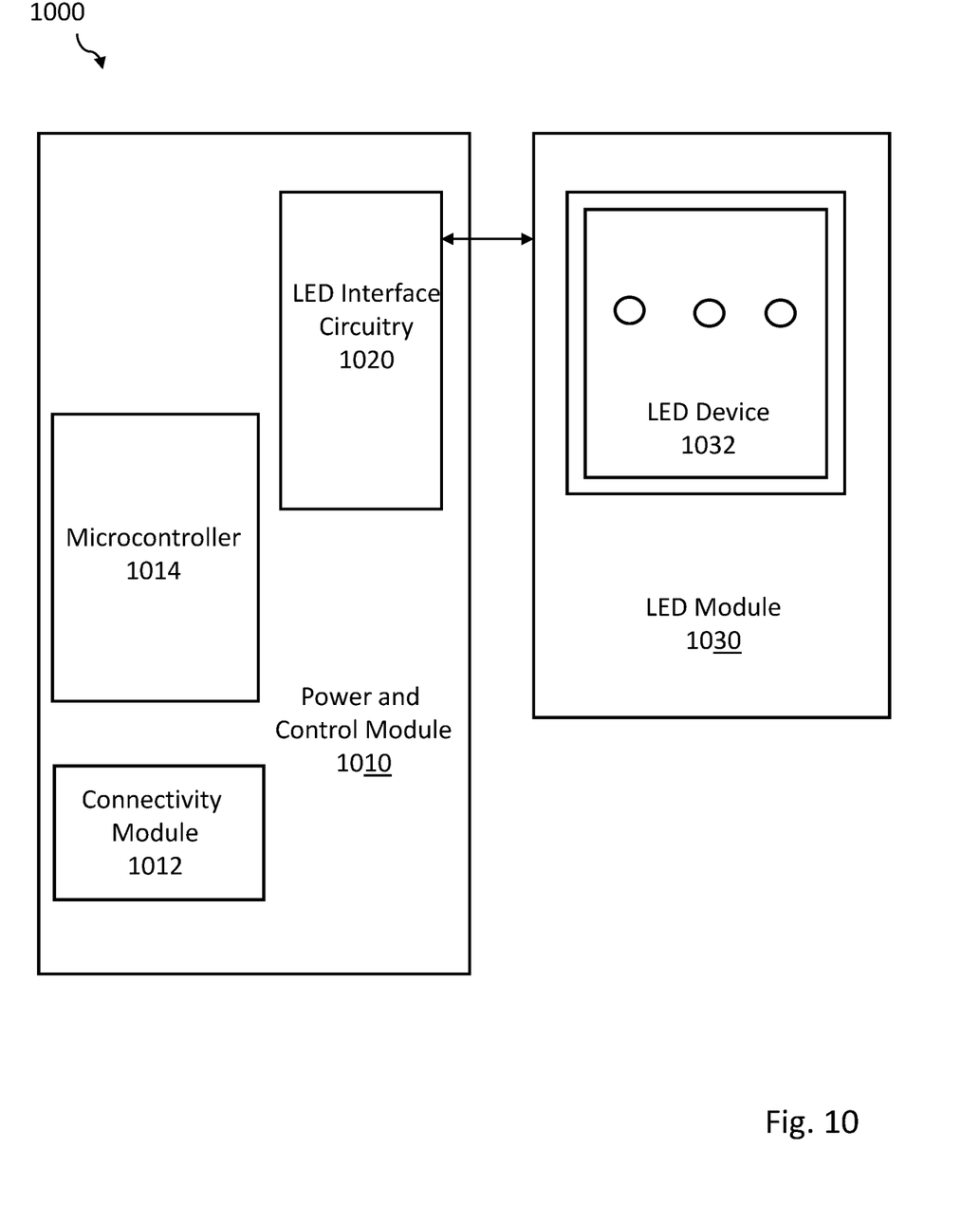
FIG. 10 illustrates a lighting control system for a luminaire with a light guide plate and side reflector.

FIG. 10 illustrates a power and LED control unit 1000 suitable for controlling a lighting system such as described herein. As seen in FIG. 10, a control unit 1000 includes a power and control module 1010 that includes a connectivity module 1012 and connected microcontroller 1014. The connectivity module 1012 can include wireless or wired connection for user or automatic control via the microcontroller 1014. In some embodiments, wirelessly connected tablets or smart phones with lighting apps installed can be used to provide lighting control and determine lighting status (e.g., lights on or off). Control and power are provided to LED device 1032 in an LED module 1030 via LED interface circuitry 1020.

The power and LED control unit 1000 includes the necessary circuitry to enable the operation of the plurality of LEDs. Furthermore, the LED circuit boards of the LED module or LED device 1032 can include the necessary circuitry to enable individual or grouped operation of the plurality LEDs in LED device 1032. In some embodiments, each LED can be separately controlled by controller, while in other embodiments groups of LEDs can be controlled as a block. In still other embodiments, both single LEDs and groups of LEDs can be controlled. In one embodiment, intensity can be separately controlled and adjusted by setting appropriate ramp times and pulse width for each LED using a pulse width modulation module control unit. This allows staging of LED activation to reduce power fluctuations, and to provide superior luminous intensity control.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A luminaire, comprising:
a light guide plate having a top surface, a bottom surface, and an edge surface connecting the top and bottom surfaces, the light guide plate configured so that light entering the edge surface is redirected to exit the top surface;
a printed circuit board having a frontside and a backside, the frontside of the printed circuit board attached to the bottom surface of the light guide plate and positioned such that the frontside of the printed circuit board is substantially parallel with the top surface of the light guide plate;
at least one surface-emitting LED attached to the frontside of the printed circuit board, a light extraction surface of the surface-emitting LED positioned substantially parallel to the top surface of the light guide plate, the at least one surface-emitting LED positioned on the printed circuit board adjacent to the edge surface of the light guide plate; and
a partially transmissive reflector attached to the top surface of the light guide plate and to the printed circuit board, the partially transmissive reflector positioned to transmit light emitted from the at least one surface-emitting LED and to reflect light emitted from the at least one surface-emitting LED into the edge surface of the light guide plate, at least some of the light reflected into the edge surface of the light guide plate exits the top surface of the light guide plate.

2. The luminaire of claim 1, wherein the partially transmissive reflector is positioned within a surrounding bezel.

3. The luminaire of claim 1, wherein the partially transmissive reflector is adhesively attached to the top surface of the light guide plate.

4. The luminaire of claim 1, wherein the partially transmissive reflector is adhesively attached to the printed circuit board.

5. The luminaire of claim 1, wherein the printed circuit board has an attached electrical connector positioned on the frontside of the printed circuit board and in electrical connection with the at least one surface-emitting LED.

6. The luminaire of claim 1, wherein the printed circuit board has an attached electrical connector positioned on the bottom side and in electrical connection with the at least one surface-emitting LED.

7. The luminaire of claim 1, wherein the printed circuit board is attached to a heat sink.

8. The luminaire of claim 7, wherein the heat sink is in contact with the bottom surface of the light guide plate.

9. The luminaire of claim 1, wherein the partially transmissive reflector is configured so that, in operation, an intensity of light transmitted by the partially transmissive reflector is substantially the same as an intensity of light exiting the top surface of the light guide plate.

10. The luminaire of claim 1, wherein the partially transmissive reflector is configured so that, in operation, an intensity of light transmitted by the partially transmissive reflector is greater than an intensity of light exiting the top surface of the light guide plate.

11. The luminaire of claim 1, wherein the partially transmissive reflector is configured so that, in operation, an intensity of light transmitted by the partially transmissive reflector is less than an intensity of light exiting the top surface of the light guide plate.

12. An LED lighting system, comprising:
a power supply;
a LED controller;
a light guide plate having a top surface, a bottom surface, and an edge surface connecting the top and bottom surfaces, the light guide plate configured so that light entering the edge surface is redirected to exit the top surface;
a printed circuit board having a frontside and a backside, the frontside of the printed circuit board attached to the bottom surface of the light guide plate and positioned such that the frontside of the printed circuit board is substantially parallel with the top surface of the light guide plate;
at least one surface-emitting LED attached to the frontside of the printed circuit board, a light extraction surface of the surface-emitting LED positioned substantially parallel to the top surface of the light guide plate, the at least one surface-emitting LED positioned on the printed circuit board adjacent to the edge surface of the light guide plate; and
a partially transmissive reflector attached to the top surface of the light guide plate and to the printed circuit board, the partially transmissive reflector positioned to transmit light emitted from the at least one surface-emitting LED and to reflect light emitted from the at least one surface-emitting LED into the edge surface of the light guide plate, at least some of the light reflected into the edge surface of the light guide plate exits the top surface of the light guide plate.

13. The LED lighting system of claim 12, wherein the reflector is positioned within a surrounding bezel.

14. The LED lighting system of claim 12, wherein the printed circuit board has an attached electrical connector positioned on the backside of the printed circuit board in electrical connection with the at least one surface-emitting LED.

15. The LED lighting system of claim 12, wherein the printed circuit board is attached to a heat sink, the in contact with the bottom surface of the light guide plate.

16. The LED lighting system of claim 12, wherein the partially transmissive reflector is configured so that, in operation, an intensity of light transmitted by the partially transmissive reflector is substantially the same as an intensity of light exiting the top surface of the light guide plate.

17. The LED lighting system of claim 12, wherein the partially transmissive reflector is configured so that, in operation, an intensity of light transmitted by the partially transmissive reflector is greater than an intensity of light exiting the top surface of the light guide plate.

18. The LED lighting system of claim 12, wherein the partially transmissive reflector is configured so that, in operation, an intensity of light transmitted by the partially transmissive reflector is less than an intensity of light exiting the top surface of the light guide plate.

19. A luminaire, comprising:
   a light guide plate having a top surface, a bottom surface, first and second edge surfaces connecting the top and bottom surfaces, the light guide plate configured so that light entering either the first or second edge surface is redirected to exit the top surface;
   a first and second printed circuit boards each having a frontside and a backside, the frontsides of the printed circuit boards attached to the bottom surface of the light guide plate and positioned such that the frontsides of the printed circuit boards are substantially parallel with the top surface of the light guide plate;
   a first surface-emitting LED attached to the frontside of the first printed circuit board positioned adjacent to the first edge surface of the light guide plate and a second surface-emitting LED attached to the frontside of the second printed circuit board positioned adjacent to the second edge surface of the light guide plate, each surface-emitting LED having a light extraction surface positioned substantially parallel to the top surface of the light guide plate;
   a first partially transmissive reflector each attached to the top surface of the light guide plate, the first partially transmissive reflector attached to the first printed circuit board, the first partially transmissive reflector positioned to transmit light emitted from the first surface-emitting LED and to reflect light emitted from the first one surface-emitting LED into the first edge surface of the light guide plate, at least some of the light reflected into the first edge surface of the light guide plate exits the top surface of the light guide plate; and
   a second partially transmissive reflector each attached to the top surface of the light guide plate, the second partially transmissive reflector attached to the second printed circuit board, the second partially transmissive reflector positioned to transmit light emitted from the second surface-emitting LED and to reflect light emitted from the second one surface-emitting LED into the second edge surface of the light guide plate, at least some of the light reflected into the second edge surface of the light guide plate exits the top surface of the light guide plate.

20. The luminaire of claim 19, wherein the partially transmissive reflector is configured so that, in operation, an intensity of light transmitted by the partially transmissive reflector is substantially the same as an intensity of light exiting the top surface of the light guide plate.

* * * * *